Aug. 9, 1938.  A. N. SZWARGULSKI  2,126,057
SLICING MACHINE
Filed April 18, 1934  3 Sheets-Sheet 1

INVENTOR.
Alexander N. Szwargulski.
By
ATTORNEY

Aug. 9, 1938.    A. N. SZWARGULSKI    2,126,057
SLICING MACHINE
Filed April 18, 1934    3 Sheets-Sheet 2

INVENTOR
Alexander N. Szwargulski
BY
ATTORNEY

Aug. 9, 1938.    A. N. SZWARGULSKI    2,126,057
SLICING MACHINE
Filed April 18, 1934    3 Sheets-Sheet 3

INVENTOR
Alexander N. Szwargulski.
ATTORNEY

Patented Aug. 9, 1938

2,126,057

UNITED STATES PATENT OFFICE 2,126,057

SLICING MACHINE

Alexander N. Szwargulski, St. Louis, Mo., assignor to Papendick, Inc., St. Louis, Mo., a corporation of Missouri Application April 18, 1934, Serial No. 721,096

22 Claims. (Cl. 146—153)

This invention relates generally to slicing-machines and has more particular reference to a baked loaf slicing-machine adapted especially, though not exclusively, for use in co-operation with an associated machine for wrapping or otherwise processing the sliced baked loaves.

For proper co-operation of the slicing-machine with the wrapping-machine, it is a matter of importance that the rate of delivery of the sliced loaves from the former machine to the latter be co-ordinated or synchronized with the periodicity or cyclic operation of the wrapping-machine. Many factors interfere, in practice, with the uniform rate of slicing the loaves and the delivery of the sliced loaves in an even progression from the slicing-machine; for examples may be mentioned, among others, such factors as conveyer-belt slippage, motor-speed fluctuation, differences in cutting-qualities of different brands or types of bread, differences in cutting-qualities of new and used knives or cutting blades, and differences in the width of the successive bread-loaves.

My inventon has hence for its prime object the provision of a slicing-machine having unique and novel automatic timing and synchronizing means for accurately and effectively controlling the feed of the unsliced loaves to the slicing-blades of the slicing-machine and for subsequently synchronizing the delivery of the resulting sliced-loaves to the wrapping or other loaf-processing machine.

My invention has for a further object the provision of an improved bread-loaf slicing-machine, which is compact, inexpensive, and highly efficient for its intended purposes.

And with the above and other objects in view, my invention resides in the novel features of form, construction, arrangement, and combination of parts presently described and pointed out in the claims.

In the accompanying drawings (three sheets),—

Figure 5 is an enlarged fragmentary partly broken view of the synchronizing mechanism of the machine, the housing and other portions being shown in section for disclosing the interior construction, the parts being shown as appearing during normal progression of the series of sliced loaves to and upon the delivery table, the leading loaf thereof being disposed in front of a flight-bar of the delivery-conveyer and the following loaf of the series resting on the tripper-plate for withdrawing the tripper-cam from the path of the principal dog of the synchronizing mechanism, whereby the latter remains in engagement with the clutch-drum for actuating the loaf-delivery conveyer, the latter being shown as removing the leading loaf of the series while the following loaf thereof is being held against movement by means of the overhead loaf-retarder device, and the loaf-feeding clutch-operator yoke being disposed in retracted or non-operating position;

Figure 7 is a view similar to Figure 5, with the drive-sprocket omitted, the parts being shown as appearing at the conclusion of the inter-cyclic operation of the loaf-delivery conveyer which follows the appearance of a sliced loaf on the delivery table after a hiatus in the progession thereof, the so-appearing loaf having engaged the tripper-plate for depressing the tripper-cam for allowing the intermediate-dog to engage the clutch-drum for moving the loaf-conveyer approximately one-half of its normal cyclic movement, and the intermediate-dog being now in position for engaging the fixed detent for release of the dog from the clutch-drum, the loaf-retarder being raised for releasing the loaf for movement thereof by a flight-bar of the conveyer, and the loaf-feeding clutch-operator being advanced to operative position and shifted for temporarily suspending actuation of the loaf-feeding conveyer;

Figures 1, 2, 3:
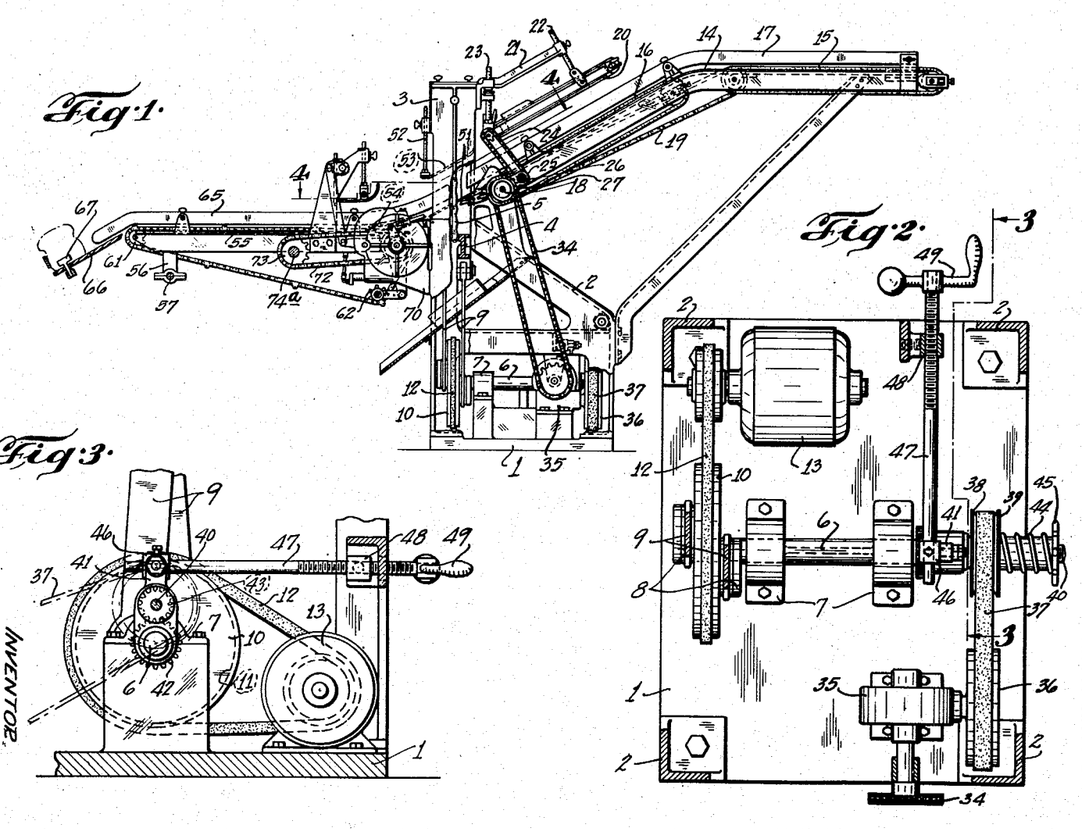
Figure 1 is a side elevational view, partly broken away and in section, of a baked loaf-slicing-machine embodying my invention.
Figure 2 is an enlarged sectional plan view of the drive-mechanism of the machine.
Figure 3 is a fragmentary sectional view of the machine, taken approximately along the line 3—3, Figure 2.

Referring now more in detail and by reference characters to the drawings, which illustrate a preferred embodiment of my invention, the main-frame of the machine comprises a base 1 on which is mounted a pair of transversely spaced upstanding side-frames 2 suitably tied and transversely braced together, the rear legs of the side-frames 2 being vertically elongated and thereby providing spaced registering upstanding standards or knife-frame guides 3, as best seen in Figure 1.

Figure 4:
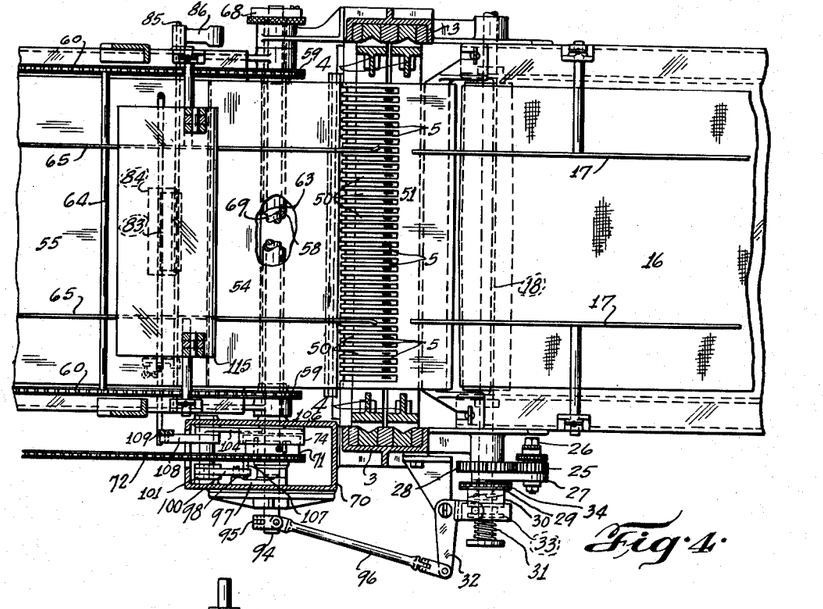
Figure 4 is an enlarged fragmentary top-plan sectional view of the machine taken approximately along the line 4—4, Figure 1, portions thereof being broken away to show the underlying construction, and the front and rear portions of the machine being omitted.

The slicing mechanism of the machine comprises a pair of confronting vertically disposed knife-carrying frames 4 operably mounted for reciprocation in and between the standards 3 for co-operably supporting series of transversely spaced pairs of intermeshing vertical slicing knives or cutting elements 5, as best seen in Figure 4.

As will presently more particularly appear, a baked loaf intended to be sliced is fed longitudinally of the machine to and through the series of slicing knives 5, one of the frames 4 being moved oppositely to the other for correspondingly actuating its particular carried series of knives 5, whereby the knives of a pair thereof are likewise oppositely reciprocated in the usual manner for the most efficacious cutting or slicing of the load into the desired number of parts or slices, as may best serve the intended purpose.

The driving mechanism for reciprocating the frames 4 and their carried knives 5 comprises a crank-shaft 6 mounted for rotation longitudinally of the machine in suitably spaced bearings 7 upstanding from the frame-base 1. At its rear end, the shaft 6 is disposed in vertical alignment with the frames 4 and carries a pair of diametrically opposed cranks 8, which are pivotally engaged with the respective lower ends of connecting-rods 9 pivotally, in turn, connected to the respective frames 4, whereby, on revolution of the shaft 6, the diametrical disposition of the cranks 8 thereon will effect contrary or opposite reciprocatory movement of the frames 4 in the intended manner.

A flywheel-pulley 10 is mounted between and preferably integrally joined to the pair of cranks 8 in such manner as to achieve, in a wholly practicable manner, a dynamic and static balance of the reciprocating and rotatory parts, the rim of the flywheel 10 being provided with a circumferential groove 11, in which is trained a V-belt 12 or the like for imparting rotatory motion directly to the cranks 8 and also, of course, to the shaft 6 from a suitable prime-mover, such as an electric-motor 13, as best seen in Figure 3.

As will be readily seen, the drive thus provided for the reciprocatory knife-carrying frames 4 is simple, yet exceedingly effective, the wheel 10 functioning not only as a pulley for motivating the connecting-rods 9, but also as a flywheel, whereby vibration is reduced to a minimum by reason of the even distribution and equalization of loads between the two connecting-rods 9.

Furthermore, such drive, when compared with other slicing-machines now on the market, is, so far as I am aware, of much lighter weight, simpler and more direct in its action, requires less power for motivation, has fewer number of parts with correspondingly low maintenance expense, avoids the use of rocker-arms, pistons, and heavy flywheels to balance the same, and renders unnecessary the enclosure of the moving parts in a crankcase or the like, thus reducing to a minimum the quantity and cost of lubrication and eliminating the expense of pumping or circulating the lubricant, as well as substantially avoiding the possibility of crumbs, which may fall upon the driving-mechanism as a result of the loaf-slicing operation, packing into and injuring the mechanism.

For feeding the baked loaves to the slicing-knives 5, there is provided a feed-table 14, which includes a relatively elevated horizontal front portion over which is trained the upper, rearwardly moving run of an endless belt or loading-conveyer 15. The horizontal portion of the table 14 merges into a downwardly inclined rear portion, over which, in turn, is trained the upper, also rearwardly moving run of an endless belt or feeding-conveyer 16. In the usual manner, the respective lateral margins of the belts 15, 16, are bounded by a pair of transversely spaced loaf-guides or wings 17 extending longitudinally over, and supported for lateral adjustable movement one relatively to the other, on the feed-table 14.

The conveyers 15 and 16 are suitaby mounted in and supported by the feed-table 14 in the usual manner well known to those skilled in the art, the loading-conveyer 15 being driven from the head-shaft 18 of the conveyer 16 by means of a suitable chain-and-sprocket arrangement 19, as best seen in Figure 1.

Also disposed longitudinally of the machine over the inclined belt 16, is an endless belt or loaf-gripper-conveyer 20, whose lower run is opposed to the upper run of the feeder-belt 16 for engaging the baked-loaves therebetween. Suitable brackets 21, extending obliquely upwardly and forwardly from the standards 3, embody means, as slidable plungers 22, 23, engaging the frame of the conveyer 20, for shiftably supporting the conveyer 20 for varying both the inclination thereof and the distance or space between the belts 16, 20, as may best serve the intended purpose, and as best seen also in Figure 1.

The conveyer 20 is driven, by means of a suitable chain-and-sprocket arrangement 24, from a gear 25 rotarily mounted on a stub-shaft 26 supported on a bracket 27 swingably mounted on the adjacent end of the head-shaft 18, the latter carrying a gear 28 meshing with the gear 25 at the desired ratio, whereby the belt 20 may be shifted more or less away from the belt 16 without affecting the driving connection between the belts, as best seen in Figures 1 and 4.

It may here be observed that the inclined arrangement of the feeder-belts 16 and 20 angularly upsets, as it may be said, the unsliced loaves and correspondingly effects an angular feeding of the respective unsliced loaves to the vertically reciprocating knives 5, with the result that the slicing of the loaves is facilitated and loaf crushing largely reduced.

On an end of the shaft 18, which is suitably for such purpose extended from a side of the machine, is mounted a jaw-clutch composed, in the usual manner, of a pair of separable members 29, 30, the driving-member 29 being freely rotatable on the shaft 18 and the driven-member 30 being rotatable with, and axially shiftable on, the shaft 18. The driven-member 30 is normally biased, as by a suitably mounted tensional member in the form of a coiled spring 31, toward, and for clutching engagement with, the driving-member 29, from which latter, however, the driven-member 30 may be shifted to unclutched or disengaged position by means of an oscillatory bell-crank 32 pivotally engaging a collar 33 sleeved on the driven-member 30, as best seen in Figure 4.

A suitable chain-and-sprocket arrangement 34 connects the driving-member 29 with the slow-speed shaft of a speed-reducer or similar torque-transmitting device 35 suitably mounted on the base 1. The high-speed shaft of the reducer 35 is provided with a pulley 36, over which is trained one loop of a V-belt 37, whose other loop is trained arcuately between a pair of opposing cone-members 38, 39, mounted on a stub-shaft 40 journaled in a bracket 41 swingably mounted on the adjacent end of the shaft 6, suitably meshing gears 42, 43, being mounted respectively on the shafts 6 and 40 for driving the latter from the former, as best seen in Figures 2 and 3.

Both of the cone-members 38, 39 revolve with the shaft 40. The cone-member 39, however, is axially shiftable on the shaft 40 and is biased toward the cone-member 38 by means of a suitably mounted tensional member in the form of a coiled spring 44, whose tension is adjustable by manipulation of a hand-wheel 45 threaded on the shaft 40, as best seen in Figure 2.

The belt 37 is engaged at its oppositely inclined side-faces with and between the respective conical-members 38, 39, which latter are so constructed that the belt 37 will readily shift radially outwardly or inwardly between the members 38, 39, as the latter approach or recede one from the other.

At its free or swingable end, the bracket 41 pivotally supports a sleeve 46, in and through which is adjustably mounted one end of a pull-rod 47, whose other end is, in turn, threaded through a sleeve 48 pivotally mounted on an adjacent frame-member 2, the rod 47 being equipped with a suitable manipulative member or hand crank 49, as best seen in Figure 3.

By suitably manipulating the rod 47, the bracket 41 may be oscillated on the shaft 6 for stretching the belt 37 and for thus forcibly drawing the same between the cone-members or wheels 38, 39, whereby the reaction of the lateral inclined faces of the belt 37 against the conical faces of the members 38, 39, is such that the resistance of the spring 44 is overcome for yielding movement of the member 39 away from the member 38 while the belt 37 slips inwardly therebetween, so that the diameter of the circle of contact of the belt 37 with the members 38, 39, is correspondingly reduced and the speed-ratio between the driven-pulley 36 and driving-members 38, 39, is likewise reduced.

By reversing the procedure, the belt 37 climbs outwardly on the members 38, 39, and the speed-ratio between the pulley 36 and members 38, 39, is thereby increased for, in such manner, regulating the loaf-feeding speed of the conveyers 15 and 16 relatively to the reciprocatory speed of the slicing knives 5 suitably to the grain and texture and "cutting" qualities of the baked loaves being sliced and suitably also to the wrapping speed of the associated machine.

The series of knives 5 work in and through a corresponding series of slots 50 provided in a grid-plate or slicing-bed 51, which is supported at a suitable inclination between the standards 3, so as to be substantially in the plane, and form a continuation, of the inclined or feed-belt 16 running over the feed-table 14. The grid 51 extends from the lower end of the conveyer 16 in front of the knives 5 to a point in the rear thereof for supporting a loaf to be sliced during its movement to and through the knives 5, the loaves being sliced passing through the knives 5 in an abutting series over the grid-plate 51 and being motivated each by its succeeding adjacent loaf responsive to delivery of the successive loaves of the series fed from the conveyer 16 to the grid-plate 51.

Depending adjustably from a cross-member 52 connecting the standards 3, is a comb-like guide or hold-down 53 having its fingers projecting obliquely upwardly and forwardly through and between the knives 5, the guide 53 being disposed at a suitable elevation above, and substantially parallel with, the grid 51 and approximately in prolongation with respect to the lower run of the gripper-belt 20 for engaging the top-face of the loaf being sliced and the slices formed therefrom during the slicing operation.

Figures 6, 7, 8, 9, 10:
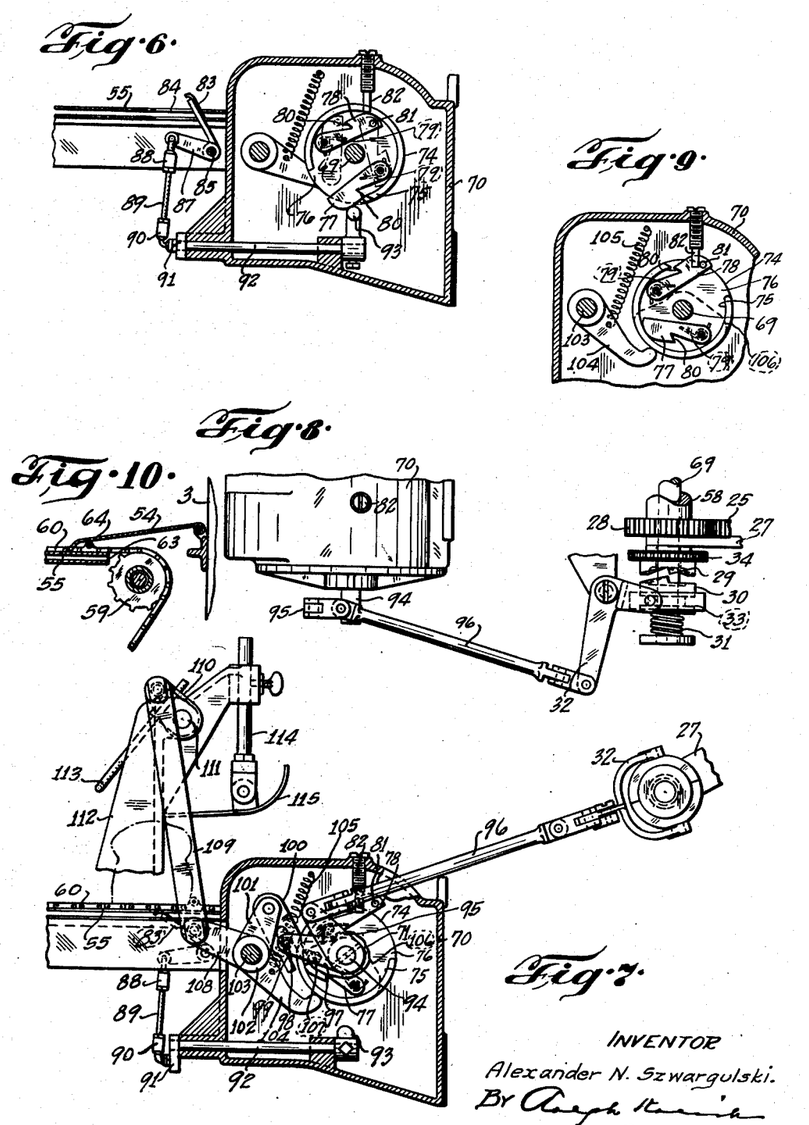
Figure 6 is an enlarged fragmentary sectional view of merely the tripper-device of the synchronizing mechanism of the machine as abnormally occurring during a hiatus in the loaf-progression, the tripper-plate being upraised for disposing the tripper-cam into the path of the dogs for disengaging the same from the clutch-drum for temporarily suspending actuation of the delivery-conveyer.
Figure 8 is an enlarged fragmentary top-plan view of the loaf-feeding clutch-operator mechanism coresponding to the position of the several parts as appearing in Figure 7, other parts of the machine being omitted.
Figure 9 is an enlarged fragmentary sectional view of the clutch-drum and associated parts, the view being complementary to Figure 7 for illustrating the manner of disengaging the intermediate-dog from the clutch-drum.
Figure 10 is a fragmentary, partly sectional view of the machine, particularly illustrating the approach of the delivery-conveyer to and upon the delivery-table.

Suitably aligning or registering with the rear end of the grid-plate 51 and suitably hingedly connected to the standards 3, as best seen in Figure 10, is a swingable flap or door 54 having its rear free margin normally engaged with or residing upon the adjacent end of an approximately horizontal rearwardly extending delivery-table 55 suitably supported at its front end from and by the respective frame-members 2.

At its rear end, the table 55 is preferably, though not necessarily, supported by means of a depending bracket 56 on a suitable frame-member 57 of the particular loaf processing-machine associated with the slicing-machine, as, for example, a wrapping-machine or the like, not shown.

At or adjacent the front end of the table 55, is suitably journaled a transverse tubular shaft or quill 58 equipped with a pair of transversely spaced chain-sprockets or wheels 59 each disposed adjacent a lateral margin of the table 55 for drivingly engaging the respective endless chains of a bar-flight or delivery conveyer 60 for movement of the upper run thereof rearwardly over the delivery-table 55.

At the rear end of the table 55, the conveyer 60 is trained over a pair of sprockets, as at 61, for descending forwardly under the table 55 to a pair of suitably supported idler or adjusting sprockets, as at 62, from which the chains of the conveyer 60 ascend to and travel over the sprockets 59, as best seen in Figures 1 and 4.

At suitably spaced intervals, the loaf-delivery conveyer 60 carries a series of transverse loaf-pusher bars 64, which, on actuation of the conveyer 60, as shortly appearing, pass upwardly over the front end 63 of the delivery table 55 and rearwardly under the flap 54, as best seen in Figure 10. On emergence from under the flap 54, which latter readily yields for the purpose, the respective bars 64 will engage any sliced loaf deposited on the table 55 from the flap 54 for transportation of the sliced loaf rearwardly to the end of the table 55.

The loaves successively transported by the pusher-bars 64 are guided in their movement over the table 55 by means of a pair of suitable transversely spaced longitudinal wings or guides 65 adjustably mounted on the table 55 for bounding the respective lateral margins of the conveyer 60, the guides 65 extending from a point in the rear of the knives 5 to a point a suitable distance beyond the rear end of the table 55, as best seen in Figure 1.

The sliced loaves are successively discharged from the table 55 preferably onto a feeder-mechanism of the loaf-processing or wrapping-machine previously mentioned. In the present instance, such feeder-mechanism comprises a feed-plate 66 supported in any suitable manner (not shown), along which travels a conveyer 67 including a series of spaced flights, which, in the embodiment illustrated, move in sequence crosswise of the longitudinal axis of the table 55 for successively delivering the sliced loaves to the wrapping-machine, from and by which latter machine the conveyer 67 is actuated at proper speed and synchronism for the efficient performance of the intended functions of the wrapping-machine.

It will be evident that, for the proper performance of the wrapping-machine feeding-mechanism, the successive sliced loaves discharged from the delivery table 55 preferably are deposited between also successive pairs of the flights of the conveyer 67, which is effected by operating the delivery conveyer 60 and its carried bars 64 in synchronism with the actuation of the wrapping-machine feeder-flights 67 by means of a synchronizing-mechanism, now to be described.

The quill-shaft 58 is suitably extended at the side of the table 55 preferably opposite to the wrapping-machine for supporting a suitable well known form of indexing device 68, which, in turn, connects the quill 58 with a shaft 69 mounted loosely in and through the quill 58, whereby the angular relationship of the quill 58 with respect to the shaft 69 may be adjustably regulated and varied, for purposes shortly appearing and as best seen in Figure 4.

At its other end, the shaft 69 is extended through the respective inner and outer walls of a housing 70 suitably mounted on the rearward leg of an adjacent side-frame 2.

On the portion of the shaft 69 disposed within the housing 70, is loosely mounted a driving-member or sprocket 71, and over the sprocket 71 is trained a sprocket-chain 72, which, passing through a suitable aperture in the rear wall of the housing 70, extends from the sprocket 71 to a sprocket-pinion 73 mounted on any suitable rotatory operating member of the associated wrapping-machine, as, for example, a shaft 74a, as shown in Figure 1, whereby preferably the sprocket 71 is driven continuously at the rate of one revolution for each cycle of operation of the associated wrapping-machine.

Figure 5:
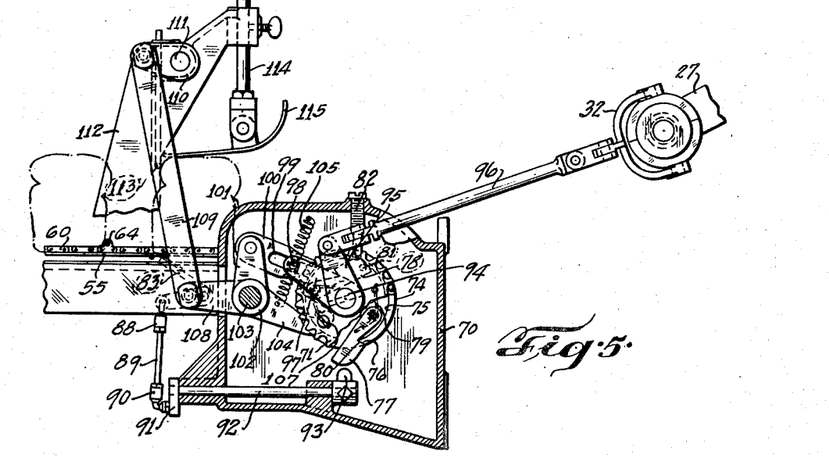

Keyed to the shaft 69 in confronting relation to preferably the inner side face of the sprocket 71, is a clutch-member or timing disc 74 having an annular or drum-like lateral flange 75, which projects from the disc 74 toward the sprocket 71, the flange 75 being partly broken away for providing a peripheral gap or opening 76, for a purpose soon appearing, and as best seen in Figure 5.

Pivotally mounted on the inner side face of the hub of the sprocket 71 is a pair of diametrically-opposed oscillatory so-called primary and secondary driving-dogs 77, 78, respectively, disposed for revolution within the annular flange 75 of the disc 74, the dogs 77, 78, being biased, as by respective tension members or springs 79, for tensional engagement of the free end of each dog with the inner peripheral face of the disc-flange 75.

When opposite the gap 76, however, the particular dog 77 or 78, as the case may be, is, under bias of its spring 79, shifted or projected through the gap 76. Each dog 77, 78, is provided with a notch or tooth 80 disposed in such manner that, when the particular dog 77 or 78 is so projected through the gap 76, the notch or tooth 80 will readily engage and become hooked upon an end-wall of the gap 76, whereby the disc 74 becomes operatively coupled or clutched to the sprocket 71 for rotatory actuation of the clutch-disc 74 and its connected shaft 69 by and with the sprocket 71. Merely one dog, as 77, at a particular moment, is shiftable through the gap 76, the other dog, as 78, being then disposed within the annular flange 75, and vice-versa, as will be understood from Figure 5.

The intermediate or secondary dog 78 is, at its free end, provided with a laterally projecting catch or pin 81, and it may here be said that, when the dog 78, if then in hook-wise engagement with the flange 75, moves in the upper portion of its circular path, the pin 81 has engagement with a trip or detent 82 depending from the upper wall of the housing 70, whereby the hook 80 of the dog 78 is released from the flange 75, the disc 74 coming to rest with the gap 76 disposed on the upper side of the shaft 69, as best seen in Figure 9.

Further revolution of the sprocket 71 carries the intermediate dog 78 past the detent 82, the dog 78 being thereby depressed sufficiently for resuming its former position within the wall of the flange 75. Meanwhile, the principal or primary dog 77 is, by rotation of the sprocket 71, brought into registration with the gap 76 of the now stationary disc 74. The dog 77 is devoid of any catch and is capable, when projected through the gap 76, of freely passing the detent 82 for engaging its hook or tooth 80 with the flange 75 for again clutching the disc 74 to the sprocket 71.

83 designates a trip-plate normally projecting obliquely upwardly through an aperture 84 provided in the table 55 at a suitable distance rearwardly of the flap 54, the plate 83 being mounted on a suitably supported rotatory trip-shaft 85 extending beneath and transversely of the table 55. At its one end, the shaft 85 is extended beyond the table 55 and carries a combination handle-member and counterweight 86 for gravitationally biasing the trip-plate 83 in normal upraised position, the member 86 being available, however, for manual manipulation of the shaft 85 for abnormally depressing the trip-plate 83 into the aperture 84.

At its end adjacent the housing 70, the shaft 85 carries a crank-arm 87, which has a suitable ball-and-socket connection, as at 88, with a depending link 89, the latter, in turn, having a ball-and-socket connection, as at 90, with a crank-arm 91 disposed upon one end of an oscillatory shaft 92 suitably journaled in and through the adjacent wall of the housing 70, all as best seen in Figures 5, 6, and 7.

At its other end, that is to say, interiorly the housing 70, the shaft 92 carries an arm or detent 93 shiftably responsive to oscillation of the shaft 92 for movement into and out of the path of the free end of the dog 77 or 78, as the case may be, when the same is projected through the gap 76 and at the time the gap 76 is disposed below the shaft 69, as best seen in Figure 6.

Suitably journaled in and through the outer wall of the housing 70 in axial alignment with the shaft 69 is an oscillatory shaft 94. On its outer end, the shaft 94 carries an arm 95 connected, as shown, by a link 96 with the bell-crank 32 of the feeding-conveyer clutch-drive.

On its inner end, the shaft 94 carries an arm 97 having a laterally projecting pin 98, which is slidably engaged in the bifurcated end 99 of a trip-lever 100, which is pivotally mounted on an arm 101 projecting from the adjacent end of a hub or sleeve 102 journaled on a suitable shaft 103 disposed crosswise of the housing 70. Projecting from the other end of the sleeve 102 is a goose-neck shaped lever or cam-follower 104, which is biased, as by a suitably mounted spring 105, for engaging the free end of the follower 104 with an edge-cam 106 mounted on and rotatable with the disc 74, as best seen in Figure 7.

Fixed on the sprocket 71, is a laterally projecting stud 107, which describes a circular orbit about the shaft 94. The cam 106 is adapted, once each revolution of the disc 74, for projecting the end of the yoke 100 across the orbit of the stud 107, which latter is so disposed that normally, when the sprocket 71 and disc 74 are in phase or synchronously connected, that is to say, when the principal or primary dog 77 is in operative engagement with the disc 74, the yoke 100 crosses the orbit of the stud 107 after the latter has passed, and is receding from, the projected end of the yoke 100, as seen in Figure 5.

However, when the intermediate or secondary dog 78 is engaged with the disc 74, the sprocket 71 and disc 74 are out of phase, as will presently more particularly appear. In such event, the yoke 100 is projected into the orbit of the stud 107 at a time when the latter is adapted for engaging the yoke 100 for swinging or oscillating the same about its pivotal connection with the arm 101.

The co-action of the pin 98 with the walls of the bifurcation or slot 99 in the yoke 100 thereupon causes the arm 97 to be swung for, in turn, oscillating the shaft 94 for actuating the bell-crank 32 through the link 96 and against the tension of the spring 31 for shifting the driven clutch-member 30 to its unclutched position spaced from the driving clutch-member 29 for suspending actuation of the head-shaft 18 and its associated loaf-feeding and other conveyers 15, 16, and 20, as best seen in Figures 7 and 8.

When the stud 107, moving in its orbit, disengages the yoke 100, the clutch-spring 31 functions for restoring clutching engagement of the clutch-members 29, 30, and likewise for correspondingly reversely actuating the arm 97 and yoke 100.

The sleeve 102 also carries an arm 108, whose free end is connected by a link 109 with a crank 110 mounted on a shaft 111 disposed in elevated position above, and transversely of, the delivery table 55.

The shaft 111 is journaled in and between suitable spaced brackets 112 upstanding from the respective lateral margins of the table 55 and carries a depending U-shaped member or loaf-retarding gate-bar 113, the bight thereof extending substantially across and above the table 55 approximately in the vertical plane of the trip-plate 83, as best seen in Figure 5.

On cam-responsive oscillation of the sleeve 102, the arm 108 is actuated for, in turn, oscillating the shaft 111 for widely rearwardly swinging the gate-bar 113, as best seen in Figure 7, and for a purpose presently appearing.

Adjustably shiftable in the respective brackets 112, is a pair of depending plungers 144 for pivotally supporting, at a suitable elevation above and over the trip-plate 83, a loaf-top guide and pressure-plate 115 rockably responsive to movement of a sliced loaf thereunder, as occasion may require, for pressing the traveling loaf in its engagement with the tripper-plate 83.

In use and operation, the motor 13 is energized for reciprocating the knives 5, and the wrapping-machine is started up, the wrapping-machine shaft 74a actuating the sprocket 71 one revolution per wrapping cycle of the wrapping-machine. Normally, the clutching-members 29, 30, are engaged for driving the feeder-conveyers 16, 20, and the loading-conveyer 15. The loaves to be sliced are deposited on the conveyer 15 and are then conveyed to and between the feeder-conveyers 16, 20, and by the latter fed to and through the slicing-knives 5.

During movement over the feed-table 14, the loaves to be sliced are laterally guided by the wings 17, and as the successive loaves approach the knives 5, each is engaged by the hold-down 53. The conveyer 16 deposits the successive loaves upon the grid-plate 51, each successive loaf then pushing the loaf previously deposited on the grid-plate 51 to and through the slicing knives 5, the speed-ratio between the cone-members 38, 39, and the pulley 36 being so adjusted for actuating the conveyers 15, 16, and 20 that normally one loaf will be fed to and through the knives 5 per one revolution of the sprocket 71.

As each loaf is fed through the knives 5, the resulting sliced loaf is engaged between the wings 65, each successive sliced loaf pushing the preceding sliced loaves to and over the flap 54, the sliced loaves normally emerging from the slicing knives 5 for movement in an abutting series or progression to and upon the delivery table 55.

So long as the feed of the sliced loaves to and upon the table 55 is of a regular and continuous nature, the primary dog 77 of the synchronizing mechanism is engaged with the clutch-disc 74 for effecting continuous actuation of the delivery-conveyer 60 through the shaft 69, indexing device 68, quill 58, and sprockets 59, the indexing device 68 being so adjusted as to bring a particular flight-bar 64 in suitable emergence from under the flap 54 into engagement with the rear face of a loaf deposited on the table 55 for transporting the loaf rearwardly thereover, the sliced loaf being discharged from the table 55 in proper position between a pair of adjacent flights of the wrapping-machine conveyer 67.

When a sliced loaf is, under normal operating conditions, deposited from the flap 54 onto the table 55, the loaf engages the trip-plate 83, and the weight of the loaf suffices for depressing the trip-plate 83 into the aperture 84, thereby rotating the shaft 85 and, in turn, through the link 89, rotating the shaft 92 for removing the detent 93 from the path of movement of the dog 77. The dog 77 thus, responsively to presence of a sliced loaf on the plate 83, remains in engagement with the disc 74 for clutching the disc 74 to the sprocket 71 and maintaining the normal loaf-conveying movement of the conveyer 60, as best seen in Figure 5.

The cam 106, as has been said, is so shaped that, so long as the dog 77 of the sprocket 71 remains in engagement with the disc 74, the cam-responsive movement of the yoke 100 is ineffective for engaging the stud 107, and the clutch-members 29, 30, remain in engagement for continuing the normal loaf-feeding actuation of the conveyers 15, 16, and 20.

Under normal conditions, the sliced loaves are fed to the table 55 at cyclic intervals, that is to say, in such manner as to deposit always, and merely, one loaf at a time between each pair of adjacent flights 64 of the conveyer 60, which is a desideratum for the efficient feeding of sliced loaves to the wrapping-machine conveyer 67. A hiatus may occur, however, in the progression of the sliced loaves from the slicing knives 5, so that, at a particular moment, a sliced loaf will not be deposited on the table 55 suitably in advance of a conveyer-flight 64, in which event it is desirable that the movement of the conveyer 60 be suspended until a sliced loaf is, in proper manner, discharged from the flap 54 onto the table 55, and the hiatus in the loaf-progression is closed.

Should such a hiatus occur in the progression of sliced loaves from the knives 5, the trip-plate 83 is, by the counterweight 86, raised through the aperture 84, thus reversely rotating the shaft 85, and, in turn, shifting the detent 93 into the path of the principal dog 77, the latter, as it moves through the lower arc of its path, being impinged on the detent 93 for thus unclutching the disc 74 from the sprocket 71 and bringing the conveyer 60 to a standstill, as best seen in Figure 6.

In the mean time, the sprocket 71 continues its rotation for bringing the intermediate dog 78 opposite the gap 76 of the disc 74. If no loaf has appeared on the table 55 by the time the intermediate dog 78 is opposite the gap 76, the detent 93 will then also lift the dog 78, so that engagement thereof with the disc 74 is prevented, and the latter remains disconnected from the sprocket 71.

The cam 106 is shaped in such manner that, when the clutch-disc 74 is so disposed in idle or stationary position, with the gap 76 on the lower side of the shaft 69, the yoke 100 is shifted away from the path of movement of the stud 107, as best seen in Figure 5, the clutch-members 29, 30, remaining in engagement for continuing the actuation of the feeder-conveyers 15, 16, and 20 during the idle period of the disc 74 and its connected delivery-conveyer 60.

If the hiatus is on the order of one loaf width, that is to say, at a cyclic interval of loaf-progression, the conveyers 15, 16, and 20 will continue to be actuated for feeding the loaves to be sliced to and through the knives 5 in such manner as to deposit a sliced loaf on the table 55, whereupon the trip 83 will again be depressed and the detent 93 removed from the path of movement of the principal dog 77, which latter, being now brought opposite the gap 76, is free to shift therethrough and engage its notch 80 with the opposing wall of the gap 76, thus again clutching the disc 74 to the sprocket 71 for resumption of the actuation of the delivery-conveyer 60.

In such event, as will be seen, the sprocket 71 has been moved a complete cycle or revolution, while the clutch-disc 74 remained stationary, whereby the conveyer 60 is restored to proper synchronism with the wrapping-machine conveyer 67.

In the event, however, that the hiatus in the loaf-progression is substantially less than a loaf-width, so that the effect of actuation of the conveyer 16 is to bring a sliced loaf onto the table 55 at about the time the intermediate dog 78 is opposite the gap 76, the trip 83 will at such time be depressed for removing the detent 93 from the path of movement of the dog 78, which latter will then be projected through the gap 76 for engaging the disc 74 and clutching the same to the sprocket 71.

Movement of the conveyer 60 will, therefore, be resumed, but the appearance of a sliced loaf on the table 55 in time to shift the detent 93 from the path of the intermediate dog 78 indicates that the progression of loaves from the knives 5 is not in synchronism with the movement of the flights 64 over the table 55, and it becomes necessary to delay the loaf-feeding movement of the conveyers 15, 16, and 20, until such time as the discrepancy is corrected.

For such purpose, during the time-interval elapsing while the intermediate dog 78 rotates the disc 74 for shifting the gap 76 from the lower to the upper side of the shaft 69, the cam 106 acts for oscillating the sleeve 102 for swinging the yoke 100 into the path of the stud 107, the latter then, in the manner set forth, actuating the yoke 100 for suspending, or causing a time-pause in, the actuation of the loaf-feeding conveyers 15, 16, and 20, as has been previously described.

Approximately at the time the stud 107 releases the yoke 100 for restoring motivation of the loaf-feeding conveyers, the intermediate dog 78 is, by means of the detent 82, disengaged from the disc 74, the latter having thus completed a half-revolution during the time-pause of the loaf-feeding conveyers, the conveyer 60 being moved merely a distance corresponding to a half-cycle, which movement, while sufficient for engaging a flight 64 with the loaf on the table 55, is not sufficient for removing the loaf from the trip-plate 83, as will be understood from Figure 7.

The disc 74 remains then unclutched from the sprocket 71 for one-half revolution thereof until the principal dog 77 is brought opposite the gap 76, which is then on the upper side of the shaft 69. In the manner previously set forth, the dog 77 now engages the disc 74 for clutching the same to the sprocket 71.

The conveyer 60 is thereby restored to phase-relation or synchronism with the sprocket 71, the latter having moved one-and-one-half revolutions while the disc 74 has, up to this time, been moved merely one-half revolution, the sprocket 71, in effect, gaining one cycle on the movement of the conveyer 60.

The delivery-conveyer 60 being now restored in cyclic registration with the sprocket 71, it will be seen that, in the interim, the following actions took place:

First, a half-cycle pause occurred in the motion of the delivery conveyer 60, during which time the feeder-conveyer 16 continued to feed loaves through the knives 5.

Next, the conveyer 60 was actuated a distance corresponding to a half-cycle, while a pause occurred in the motion of the feeding-conveyer 16.

Finally, both of the conveyers 16 and 60 are again actuated in unison and in cyclic-relation with the associated wrapping-machine.

It may be pointed out that, while merely one dog, as the principal dog 77, may be employed for clutching the disc 74 to the sprocket 71, it is preferable to employ two of the dogs, as 77, 78, for the reason that the displacement in phase-relationship between the sprocket 71 and disc 74, as thus described, serves most effectively for providing for the automatic stoppage or pause in the movement of the feeding-conveyer 16 during the time the delivery-conveyer 60 is "dropping" a cycle, as it may be said, whereby, as will be seen, the possibility of depositing two loaves on the table 55 between one pair of the flights 64 is substantially eliminated.

Thus, by providing for a timed pause of the feeding-belt 16 whenever a hiatus occurs in the loaf-progression, the machine is enabled automatically to retime itself for adjusting variations in the speed relations between the feeding-conveyer 16 and the delivery-conveyer 60.

For a similar purpose, the overhead loaf-stop or gate-bar 113 is provided for preventing the possibility of any loaves moving past the tripping-plate 83 far enough to allow two loaves to crowd into one flight-spacing of the conveyer 60. As will be understood from Figure 7, the cam-responsive cyclic oscillation of the sleeve 102 serves, at the proper time, for swinging the gate 113 upwardly and out of the way of movement of the loaf being pushed from the trip-plate 83 responsive to engagement of the loaf by a flight 64 of the conveyer 60, the cam 106 thereafter acting for swinging the gate 113 downwardly behind the receding loaf for impeding the movement of a following loaf and holding the same on the trip-plate 83, as best seen in Figure 5.

Preferably for efficient operation, the trip-member 83 is located a full loaf's width from the free end of the swingable flap 54, so as to permit the particular loaf moving from the flap 54 to rest evenly on the table 55 for engagement by the particular flight-bar 64 emerging from under the flap 54, such space being subject to adjustment to meet the conditions presented by different types or widths of loaf, and preferably also, to facilitate transportation of the several loaves along the table 55, the several flight-bars 64 are freely rotatable in their respective bearings.

It will be seen that the slicing machine of my invention accomplishes its intended purposes in a highly efficient, wholly automatic, and practicable manner. The machine occupies a relatively small space, may be most inexpensively constructed, is readily adjusted for accommodating its operation to changing conditions, may with ease and facility be co-ordinated with an associated loaf-processing machine, and embodies a smoothly running, novel, and relatively noiseless mechanism for reciprocating the slicing knives.

It will be understood that changes and modifications in the form, construction, arrangement, and combination of the several parts of the machine may be made and substituted for those herein shown and described without departing from the nature and principles of my invention.

Having thus described my invention, what I claim and desire to secure by Letters Patent is:—

1. In a baked loaf slicing machine, in combination, slicing means, a conveyer movable for feeding a progression of loaves to be sliced to and through the slicing means, a second conveyer movable for transporting successive loaves at cyclic intervals from the progression of sliced loaves emerging from the slicing means, driving means for the conveyers, clutching means associated with the driving means and including a clutch-disc and first and second revolvable dogs alternatively engageable with the disc, means for engaging the first dog with the disc for effecting continuous movement of the transporting conveyer when successive loaves are delivered thereto at cyclic intervals, and means for successively disengaging the first dog from, engaging and then disengaging the second dog from and with, and then re-engaging the first dog with, said disc for effecting delayed movement of the transporting conveyer when a loaf is delivered thereto at other than a cyclic interval.

2. In a baked loaf slicing machine, in combination, slicing means, a conveyer movable for feeding a progression of loaves to be sliced to and through the slicing means, a second conveyer movable for transporting successive loaves at cyclic intervals from the progression of sliced loaves emerging from the slicing means, driving means for the conveyers, clutching means associated with the driving means and including a clutch-disc and first and second revolvable dogs alternatively engageable with the disc, means for engaging the first dog with the disc for effecting continuous movement of the transporting conveyer when successive loaves are delivered thereto at cyclic intervals, means for successively disengaging the first dog from, engaging and then disengaging the second dog from and with, and then re-engaging the first dog with, said disc for effecting delayed movement of the transporting conveyer when a loaf is delivered thereto at other than a cyclic interval, and means actuable when the second dog is engaged with the disc for concurrently delaying movement of the feeding conveyer.

3. In a loaf-slicing machine, in combination, a table, a quill mounted for rotation transversely under the table, an endless loaf-conveyer disposed for travel over and under the table, the conveyer including driving sprockets fixed on the quill, a rotary shaft extending for rotation longitudinally within the quill, means operatively connecting the quill and shaft for concurrent rotation, a first member loosely mounted for rotation on the shaft, mechanism for normally maintaining said member in rotary movement, second mechanism including a shiftable second member rotatable with the shaft and engageable with the first member for drivingly connecting the first member with the shaft for actuating the conveyer in synchronism with said first mechanism, and mechanism including a loaf-actuable member for governing the engagement and disengagement of the first and second members for effecting actuation or suspending actuation of the conveyer.

4. In a loaf-slicing machine, in combination, an apertured table, a quill mounted for rotation transversely under the table, an endless loaf-conveyer disposed for travel over and under the table, the conveyer including driving sprockets fixed on the quill, a rotary shaft extending for rotation longitudinally within the quill, means operatively connecting the quill and shaft for concurrent rotation, a first member loosely mounted for rotation on the shaft, mechanism for normally maintaining said member in rotary movement, second mechanism including a shiftable second member rotatable with the shaft and engageable with the first member for drivingly connecting the first member with the shaft for actuating the conveyer in synchronism with said first mechanism, and mechanism including a loaf-depressible trip-plate rockable in the aperture of the table for governing the engagement and disengagement of the first and second members for effecting actuation or suspending actuation of the conveyer.

5. In a loaf-slicing machine, in combination, an apertured table, a quill mounted for rotation transversely under the table, an endless loaf-conveyer disposed for travel over and under the table, the conveyer including driving sprockets fixed on the quill, a rotary shaft extending for rotation longitudinally within the quill, means operatively connecting the quill and shaft for concurrent rotation, a first member loosely mounted for rotation on the shaft, mechanism for normally maintaining said member in rotary movement, second mechanism including a swingable dog rotatable with the shaft and engageable with the first member for drivingly connecting the first member with the shaft for actuating the conveyer in synchronism with said first mechanism, and mechanism including a loaf-depressible trip-plate rockable in the aperture of the table and a shiftable dog-engageable detent for governing the engagement and disengagement of the dog and first member for effecting actuation or suspending actuation of the conveyer.

6. In a loaf-slicing machine, in combination, an apertured table, a quill mounted for rotation transversely under the table, an endless loaf-conveyer disposed for travel over and under the table, the conveyer including driving sprockets fixed on the quill, a rotary shaft extending for rotation longitudinally within the quill, means operatively connecting the quill and shaft for concurrent rotation, a disc having an interrupted lateral flange loosely mounted for rotation on the shaft, mechanism for normally maintaining the disc in rotary movement, second mechanism including a swingable dog rotatable with the shaft and engageable with the disc-flange for drivingly connecting the disc with the shaft for actuating the conveyer in synchronism with said first mechanism, and mechanism including a loaf-depressible trip-plate rockable in the aperture of the table and a shiftable dog-engageable detent for governing the engagement and disengagement of the dog and disc for effecting actuation or suspending actuation of the conveyer.

7. In a baked loaf-slicing machine, in combination, slicing means, a first conveyer for feeding a progression of loaves to be sliced to the slicing means, an apertured table, a quill mounted for rotation transversely under the table, a second conveyer traveling over and under the table in a path parallel with the path of travel of the first conveyer for shifting the sliced loaves from the machine, the second conveyer including driving sprockets fixed on the quill, a rotary shaft extending for rotation longitudinally within the quill, means operatively connecting the quill and shaft for concurrent rotation, a member loosely mounted for rotation on the shaft, mechanism for normally maintaining said member in rotary movement, mechanism for drivingly connecting said member with the shaft for actuating the second conveyer, mechanism including a loaf-actuable member rockable in the aperture of the table for governing the engagement and disengagement of said member and the shaft for effecting actuation or suspending actuation of the second conveyer, mechanism for driving the first conveyer in cyclic relation to the second conveyer, and mechanism automatically governed by said connecting mechanism for interrupting travel of the first conveyer for maintaining cyclic relation between the conveyers.

8. In a baked loaf-slicing machine, in combination, slicing means, a first conveyer for feeding a progression of loaves to be sliced to the slicing means, a table, a quill mounted for rotation transversely under the table, a second conveyer traveling over and under the table in a path parallel with the path of travel of the first conveyer for shifting the sliced loaves from the machine, the second conveyer including driving sprockets fixed on the quill, a rotary shaft extending for rotation longitudinally within the quill, means operatively connecting the quill and shaft for concurrent rotation, a member loosely mounted for rotation on the shaft, mechanism for normally maintaining said member in rotary movement, second mechanism including a shiftable member engageable with the first member for drivingly connecting the first member with the shaft for actuating the second conveyer in synchronism with said first mechanism, loaf-actuable mechanism for governing the engagement and disengagement of said members for controlling actuation or suspending actuation of the second conveyer, mechanism for actuating the first conveyer in cyclic relation to the second conveyer, and mechanism automatically governed by said connecting mechanism for interrupting travel of the first conveyer for maintaining cyclic relation between the conveyers.

9. In a baked loaf-slicing machine, in combination, slicing means, a first conveyer for feeding a progression of loaves to be sliced to the slicing means, an apertured table, a quill mounted for rotation transversely under the table, an endless second conveyer traveling over and under the table in a path parallel with the path of travel of the first conveyer for shifting the sliced loaves from the machine, the second conveyer including driving sprockets fixed on the quill, a rotary shaft extending for rotation longitudinally within the quill, means operatively connecting the quill and shaft for concurrent rotation, a member loosely mounted for rotation on the shaft, mechanism for normally maintaining said member in rotary movement, mechanism for drivingly connecting said member with the shaft for actuating the second conveyer, mechanism including a loaf-actuable member rockable in the aperture of the table for governing the engagement and disengagement of said member and the shaft for effecting actuation or suspending actuation of the second conveyer, mechanism including co-operable clutch-members for actuating the first conveyer in cyclic relation to the second conveyer, and mechanism automatically governed by said connecting mechanism for disconnecting said clutch-members for temporarily interrupting travel of the first conveyer for maintaining cyclic relation between the conveyers.

10. In a baked loaf-slicing machine, in combination, slicing means, a first conveyer for feeding a progression of loaves to be sliced to the slicing means, an apertured table, a quill mounted for rotation transversely under the table, an endless second conveyer traveling over and under the table in a path parallel with the path of travel of the first conveyer for shifting the sliced loaves from the machine, the second conveyer including driving sprockets fixed on the quill, a rotary shaft extending for rotation longitudinally within the quill, means operatively connecting the quill and shaft for concurrent rotation, a member loosely mounted for rotation on the shaft, mechanism for normally maintaining said member in rotary movement, mechanism for drivingly connecting said member with the shaft for actuating the second conveyer, mechanism including a loaf-actuable member rockable in the aperture of the table for governing the engagement and disengagement of said member and the shaft for effecting actuation or suspending actuation of the second conveyer, mechanism including cooperable clutch-members normally yieldingly engaged for actuating the first conveyer in cyclic relation to the second conveyer, and cam-actuable mechanism automatically governed by said connecting mechanism for disconnecting said clutch-members for temporarily interrupting travel of the first conveyer for maintaining cyclic relation between the conveyers.

11. In a loaf-slicing machine, in combination, a table, a loaf-conveyer disposed for travel over the table, the conveyer including a rotary shaft, a clutch-disc loosely mounted for rotation on the shaft, mechanism for normally maintaining the disc in rotary movement, first and second swingable dogs rotatable with the shaft for alternate engagement with the disc for drivingly connecting the disc with the shaft for actuating the conveyer, mechanism including a loaf-depressible trip-plate for governing the engagement and disengagement of the dogs and the disc for controlling actuation or suspending actuation of the conveyer, mechanism including cooperable clutch-members for actuating the first conveyer, and mechanism automatically governed by said connecting mechanism for disconnecting said clutch-members on and during engagement of the second dog with the disc for temporarily interrupting travel of the first conveyer for maintaining cyclic relation between the conveyers.

12. In a loaf-slicing machine, in combination, a table, a loaf-conveyer disposed for travel over the table, the conveyer including a rotary shaft, a disc loosely mounted for rotation on the shaft, mechanism for normally maintaining the disc in rotary movement, second mechanism including a swingable dog rotatable with the shaft and engageable with the disc for drivingly connecting the disc with the shaft for actuating the conveyer in synchronism with said first mechanism, mechanism including a loaf-depressible trip-plate and a shiftable detent for governing the engagement and disengagement of the dog and disc for controlling actuation or suspending actuation of the conveyer, a shiftable loaf-engaging and retarding gate disposed for movement over the table adjacent said plate, and means for shifting the gate at predetermined intervals during rotary movement of the connected dog and disc.

13. In a loaf-slicing machine, in combination, a table, a loaf-conveyer disposed for travel over the table, the conveyer including a rotary shaft, a disc loosely mounted for rotation on the shaft, mechanism for normally maintaining the disc in rotary movement, second mechanism including a swingable dog rotatable with the shaft and engageable with the disc for drivingly connecting the disc with the shaft for actuating the conveyer in synchronism with said first mechanism, mechanism including a loaf-depressible trip-plate and a shiftable detent for governing the engagement and disengagement of the dog and disc for controlling actuation or suspending actuation of the conveyer, a shiftable loaf-engaging and retarding gate disposed for movement over the table adjacent said plate, and cam-actuable means for automatically shifting the gate at predetermined intervals during rotary movement of the dog and disc.

14. In a baked loaf-slicing machine, in combination, slicing means, a table, a conveyer disposed for travel over the table for shifting the sliced loaves from the machine, a quill mounted for rotation transversely under the table, the conveyer including driving sprockets fixed on the quill, a shaft extending for rotation longitudinally within the quill, means for rotarily actuating the shaft, and means automatically operable responsive to load conditions on the conveyer for connecting the shaft with the quill for driving the conveyer continuously in a single direction.

15. In a baked loaf-slicing machine, in combination, slicing means, a table, a conveyer disposed for travel over the table for shifting the sliced loaves from the machine, a quill mounted for rotation transversely under the table, the conveyer including driving-sprockets fixed on the quill, a shaft extending for uni-directional rotation longitudinally within the quill, and indexing means for operatively connecting, and adjustably varying the angular relationship between, the quill and shaft.

16. In a loaf-slicing machine, in combination, slicing mechanism including a pair of confronting knife-carrying frames disposed for reciprocation in spaced vertical planes, and mechanism for oppositely reciprocating the frames, said mechanism comprising a prime-mover, a drive-shaft disposed transversely to the frames and in spaced parallel relation with the shaft of the prime-mover, a pulley fixed on the drive-shaft and disposed intermediate the planes of reciprocation of the knife-frames, a flexible driving-connection between the pulley and the prime-mover shaft, a pair of diametrically opposed cranks mounted on the opposite sides of the pulley, and rods respectively connecting the frames and cranks.

17. In a loaf-slicing machine, in combination, slicing mechanism including a pair of knife-carrying frames disposed for reciprocation in spaced vertical planes, and mechanism for oppositely reciprocating the frames, said mechanism comprising a prime-mover, a drive-shaft disposed transversely to the frames and in spaced parallel relation with the shaft of the prime-mover, a unitary member fixed on the drive-shaft comprising a pair of diametrically opposed cranks and a pulley intermediate and joined to the cranks, the pulley being disposed also intermediate the planes of reciprocation of the knife-frames, a flexible driving-connection between the pulley and the prime mover-shaft, and rods respectively connecting the frames and cranks.

18. In a baked loaf slicing machine, in combination, slicing means, a feed-conveyer for progressing the loaves through the slicing means for slicing operation, a discharge-conveyer for receiving the loaves from the slicing means, feed-conveyer driving means for normally continuous driving connection with the feed-conveyer, discharge-conveyer driving means for normally continuous driving connection with the discharge-conveyer, and control means actuable by the bread loaves issuing from the slicing means onto the discharge-conveyer for interrupting the continuous operation of the discharge-conveyer responsively to interruption in the normal sequential flow of bread loaves from the slicing means to the discharge-conveyer.

19. In a baked loaf slicing machine, in combination, slicing means, a feed-conveyer for progressing the loaves through the slicing means for slicing operation, a discharge-conveyer for receiving the loaves from the slicing means, feed-conveyer driving means for normally continuous driving connection with the feed-conveyer, discharge-conveyer driving means for normally continuous driving connection with the discharge-conveyer, primary control means actuable by the bread loaves issuing from the slicing means onto the discharge-conveyer for interrupting the continuous operation of the discharge-conveyer responsively to interruption in the normal sequential flow of the loaves from the slicing means to the discharge-conveyer, and secondary control means actuable by the primary control means for retarding the movement of the feed-conveyer during interrupted operation of the discharge-conveyer.

20. In a slicing machine, slicer means, normally continuous feed-conveyer means, discharge-conveyer means for normally continuous operation in phase relationship with the feed-conveyer, and control means for automatically re-adjusting said phase relationship between the feed-conveyer means and the discharge-conveyer means upon any abnormal disturbance of said phase relationship.

21. In a slicing machine, slicer means, normally continuous feed-conveyer means, discharge-conveyer means normally continuously operable in phase relationship with the feed-conveyer, and control means for automatically retarding the operation of the discharge-conveyer means responsive to any abnormal disturbance of the phase relationship between the discharge-conveyer means and the feed-conveyer means.

22. In a slicing machine, slicer means, normally continuous feed-conveyer means, discharge-conveyer means normally continuously operable in phase relationship with the feed-conveyer, control means for retarding the operation of the discharge-conveyer means responsive to any abnormal disturbance of the phase relationship between the discharge conveyer means and the feed-conveyer means, and means operably connected to the feed-conveyer means for correspondingly retarding the operation of the feed-conveyer means. until normal operation of the discharge-conveyer means is resumed.

ALEXANDER N. SZWARGULSKI.